United States Patent [19]
Yokoyama et al.

[11] Patent Number: 5,621,832
[45] Date of Patent: Apr. 15, 1997

[54] BEAM SPLITTER AND OPTICAL COUPLER USING THE SAME

[75] Inventors: Jun Yokoyama, Tokyo; Masaaki Miyake, Shizuoka, both of Japan

[73] Assignees: NEC Corporation; Vacuum Optics Corporation, both of Japan

[21] Appl. No.: 355,853

[22] Filed: Dec. 14, 1994

[30] Foreign Application Priority Data

Dec. 14, 1993 [JP] Japan .................................. 5-313455

[51] Int. Cl.$^6$ .................................................. G02B 6/26
[52] U.S. Cl. .................................................. 385/48; 359/586
[58] Field of Search .................................. 359/634, 586, 359/588, 589; 385/48, 31, 36, 37, 42, 15, 16, 17, 18, 20, 21

[56] References Cited

U.S. PATENT DOCUMENTS

| | | | |
|---|---|---|---|
| 3,858,965 | 1/1975 | Sumita | 359/588 |
| 4,367,921 | 1/1983 | Sawamua et al. | 359/586 |
| 5,400,179 | 3/1995 | Ito | 359/588 |

FOREIGN PATENT DOCUMENTS 62-269106  11/1987  Japan .

OTHER PUBLICATIONS

Hiroaki Matsuda and Hideki Noda, "A Polarization–Independent Optical Coupler Film", Proceedings of the 1993 IEICE Spring Conference, Part 4, Communications Electronics, The Institute of Electronics, Information and Communication Engineers, Mar. 28–31, 1993, Nagoya University, total three pages.

*Primary Examiner*—John Ngo
*Attorney, Agent, or Firm*—Ostrolenk, Faber, Gerb & Soffen, LLP

[57] ABSTRACT

A beam splitter is an optical multilayer film obtained by sequentially stacking first to fifth layers respectively having refractive indexes of $n_1$ to $n_5$ and geometrical thicknesses $d_1$ and $d_5$ on a substrate having a refractive index $n_G$. The refractive indexes of the substrate and the first to fifth layers satisfy any one of a relationship of $n_G=1.45$ to 1.60, $n_1=2.02$ to 2.20, $n_2=2.25$ to 2.38, $n_3=1.44$ to 1.47, $n_4=2.25$ to 2.38, and $n_5=1.44$ to 1.47, a relationship of $n_G=1.45$ to 1.60, $n_1=1.44$ to 1.47, $n_2=2.25$ to 2.38, $n_3=1.44$ to 1.47, $n_4=2.25$ to 2.38, and $n_5=2.02$ to 2.20, and a relationship of $n_G=1.45$ to 1.60, $n_1=1.44$ to 1.47, $n_2=2.25$ to 2.38, $n_3=2.02$ to 2.20, $n_4=2.25$ to 2.38, and $n_5=1.44$ to 1.47, and a geometrical thickness $d_i$ of an ith layer of the first to fifth layers satisfies relation $n_i d_i \cos(\theta_i) = \lambda/4$, where $n_i$ is a refractive index of the ith layer, $\theta_i$ is an angle of refraction in the ith layer, and $\lambda$ is a center wavelength of an incident light beam to the multilayer film with an angle of incidence of 40° to 50°.

33 Claims, 3 Drawing Sheets

BEAM SPLITTER AND OPTICAL COUPLER USING THE SAME

BACKGROUND OF THE INVENTION

The present invention relates to a beam splitter and an optical coupler which are used in an optical communication system and, more particularly, to a beam splitter which transmits about 85% of a beam incident to the beam splitter at about 45° and reflects about 15% of the beam independently of the polarization state of the beam and an optical coupler using the same.

In recent years, demands for transmission of a large volume of information have been enhanced, an optical communication system using optical fibers has been used in place of a conventional communication system using copper cables. In order to constitute such an optical communication system, in addition to an optical active device for performing electrooptical conversion or photoelectric conversion, an optical passive device such as an optical coupler for branching an optical signal or an optical switch for performing time or spatial switching of optical paths is required.

Of the above devices, the optical coupler having a characteristic feature in which a beam can be branched at a predetermined ratio independently of the polarization state of an incident beam is desired. This characteristic feature is particularly required when the optical coupler is used in a system such as a single-mode optical fiber transmission system in which the polarization state of a beam traveling in an optical fiber changes.

According to a conventional technique, a beam splitter must be combined to a total reflection element to realize such an optical branching operation independent of polarization.

FIG. 4 shows a conventional optical coupler. Note that this optical coupler is proposed in Japanese Patent Laid-Open No. 62-269106. The optical coupler is constituted by optical fibers 31a to 31d, lenses 32a to 32d, total reflection elements 33a to 33d, a beam splitter 34 using a dielectric multilayer film, and a housing 35 for fixing these parts to each other. The total reflection elements 33a to 33d are arranged mainly to decrease the angle of incidence of a beam incident to the beam splitter 34 (close to normal incidence). For example, a beam guided inside the housing 35 by the optical fiber 31a and the lens 32a is totally reflected by the total reflection element 33a and then incident to the beam splitter 34 at a small angle of incidence. The beam incident to the beam splitter 34 is partially reflected, and the reflected beam is totally reflected by the total reflection element 33b and then output to the optical fiber 31b. The beam transmitted through the beam splitter 34 is guided to the optical fiber 31c by the total reflection element 33c.

Note that when a beam is incident to a conventional splitter at a large angle of incidence (e.g., 45°), the branching ratio of the beam changes depending on the polarization state of the incident beam. In order to prevent this, the angle of incidence of a beam incident to the beam splitter 34 is decreased using the total reflection elements 33a to 33d.

As described above, in a conventional beam splitter, the angle of incidence of a beam must be suppressed to prevent a branching ratio from being dependent on the polarization state of the beam. For this reason, in order to constitute an optical coupler from which a beam can be output at a proper angle, the beam splitter must be combined to total reflection elements. Therefore, the optical coupler cannot be easily decreased in size.

SUMMARY OF THE INVENTION

It is an object of the present invention to provide a beam splitter in which a beam incident to the splitter at about 45° can be branched at a predetermined ratio independently of the polarization state of the beam.

It is another object of the present invention to provide an optical coupler which can branch an incident beam at a predetermined ratio independently of the polarization state of the incident beam without using a total reflection element.

In order to achieve the above objects of the present invention, there is provided a beam splitter which is an optical multilayer film obtained by sequentially stacking first to fifth layers respectively having refractive indexes of $n_1$ to $n_5$ and geometrical thicknesses $d_1$ to $d_5$ on a substrate having a refractive index $n_G$, wherein the refractive indexes of the substrate and the first to fifth layers satisfy any one of a relationship of $n_G$=1.45 to 1.60, $n_1$=2.02 to 2.20, $n_2$=2.25 to 2.38, $n_3$=1.44 to 1.47, $n_4$=2.25 to 2.38, and $n_5$=1.44 to 1.47, a relationship of $n_G$=1.45 to 1.60, $n_1$=1.44 to 1.47, $n_2$=2.25 to 2.38, $n_3$=1.44 to 1.47, $n_4$=2.25 to 2.38, and $n_5$=2.02 to 2.20, and a relationship of $n_G$=1.45 to 1.60, $n_1$=1.44 to 1.47, $n_2$=2.25 to 2.38, $n_3$=2.02 to 2.20, $n_4$=2.25 to 2.38, and $n_5$=1.44 to 1.47, and a geometrical thickness $d_i$ of an ith layer of the first to fifth layers satisfies relation $n_i d_i \cos(\theta_i) = \lambda/4$, where $n_i$ is a refractive index of the ith layer, $\theta_i$ is an angle of refraction in the ith layer, and $\lambda$ is a center wavelength of an incident light beam to the multilayer film with an angle of incidence of 40° to 50°.

DESCRIPTION OF THE PREFERRED EMBODIMENT

An embodiment of the present invention will be described below in detail.

Figure 1:
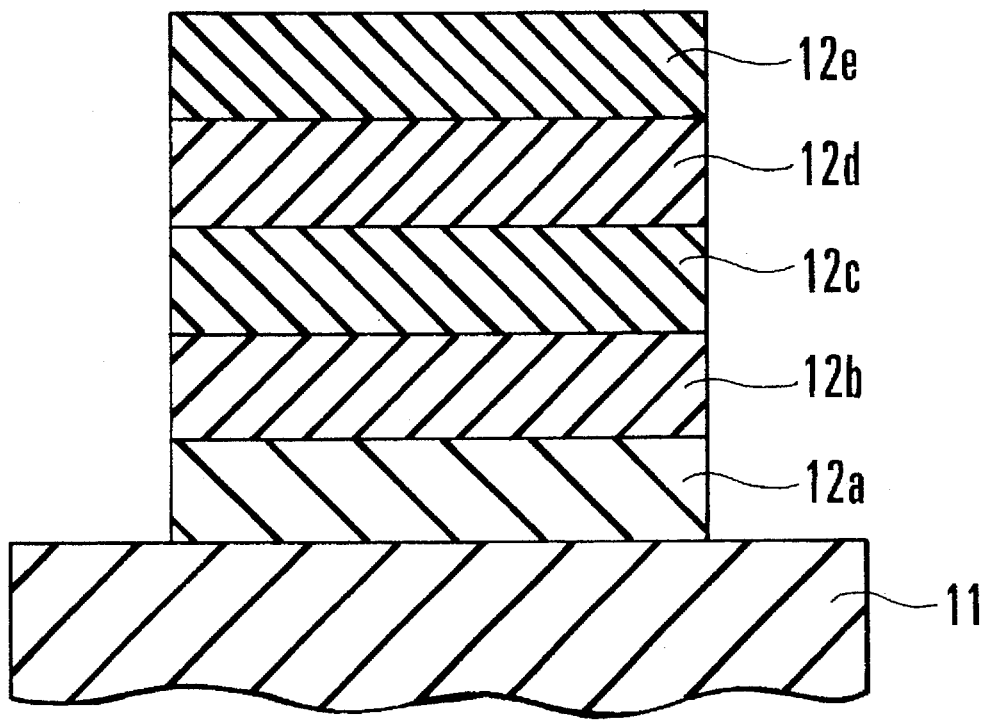
FIG. 1 is a sectional view showing the arrangement of a beam splitter according to an embodiment of the present invention.

FIG. 1 shows the structure of a beam splitter according to an embodiment of the present invention, and Table 1 describes materials used for forming layers constituting the beam splitter and the refractive indexes and thicknesses of layers consisting of these materials. As shown in FIG. 1, the beam splitter of this embodiment is obtained by stacking first to the fifth dielectric thin layers 12a to 12e on a glass substrate 11. Each layer, as described in Table 1, consist of silicon dioxide ($SiO_2$), titanium dioxide ($TiO_2$), or tantalum oxide (V) ($Ta_2O_5$). Note that the beam splitter of this embodiment is to be formed, by means of vacuum deposition with bombardment of ions produced from oxygen plasma.

TABLE 1

|  | Material | Refractive Index | Thickness (nM) |
| --- | --- | --- | --- |
| Fifth Layer 12e | $SiO_2$ | 1.45 | 306.1 |
| Fourth Layer 12d | $TiO_2$ | 2.32 | 175.4 |
| Third Layer 12c | $SiO_2$ | 1.45 | 306.1 |
| Second Layer 12b | $TiO_2$ | 2.32 | 175.4 |
| First Layer 12a | $Ta_2O_5$ | 2.085 | 197.6 |
| Substrate | glass | 1.51 | |

The combination of these materials shown in Table 1 was obtained by a simulation calculation of spectral reflectance characteristics in a way that the dependence of a branching ratio for a polarized beam decreased when a beam having a wavelength of 1,550 nm was incident at 45°. In addition, it was assumed that the refractive index of an ith layer is represented by $n_i$, and angle of refraction in the ith layer is represented by $\theta_i$, and beam having a center wavelength $\lambda$ is incident to the multilayer, and a thickness $d_i$ of the ith layer is defined such that $n_i d_i \cos(\theta_i) = \lambda/4$ is satisfied.

Figure 2:
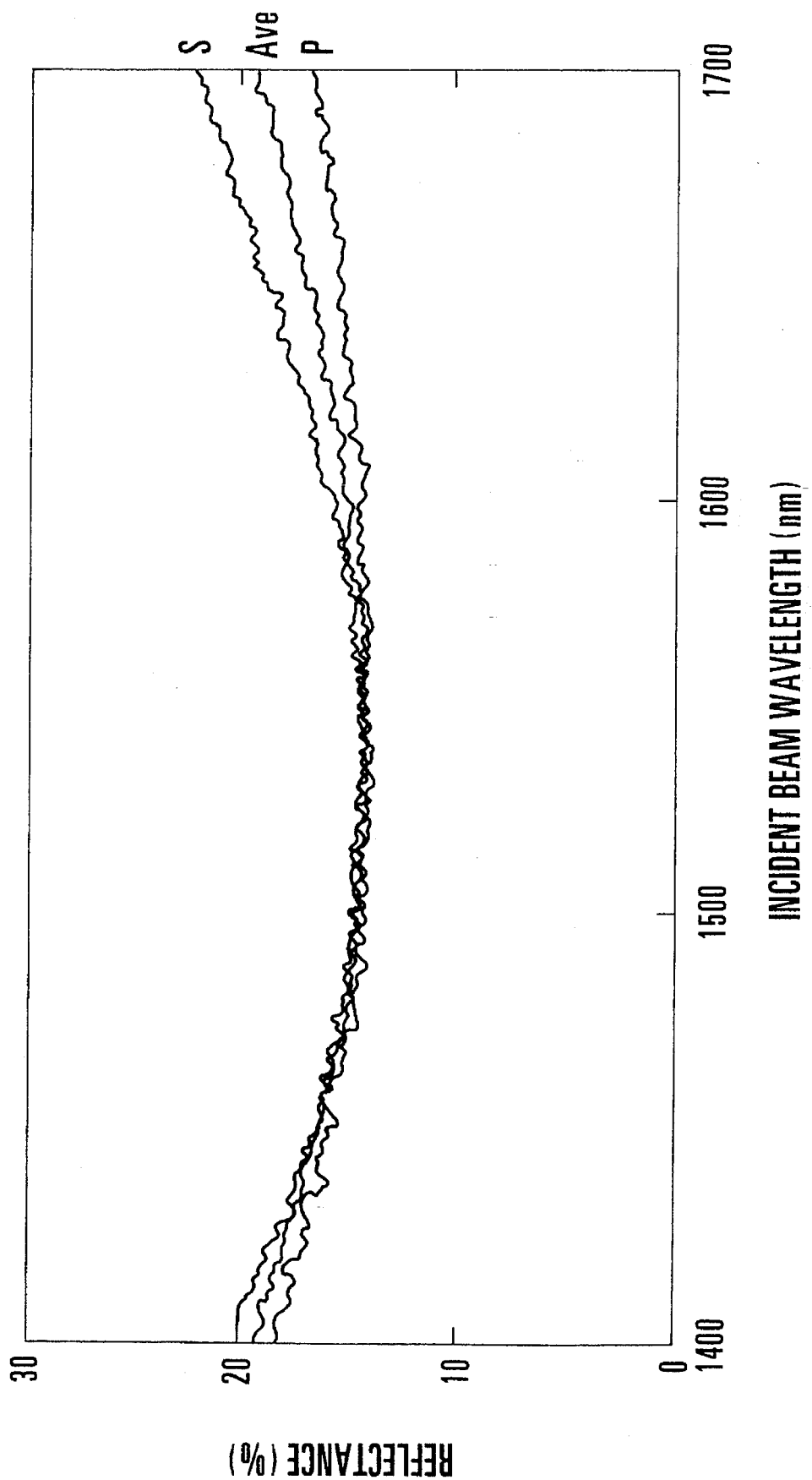
FIG. 2 is a graph showing the observed dependence of the spectral reflectance of the beam splitter of the embodiment on an incident beam wavelength.

FIG. 2 shows results obtained by measuring spectral reflectance characteristics when a beam is incident to the beam splitter at an angle of incidence of 45°. In this manner, when a light beam having a wavelength within a wavelength range of ±40 nm relative to a design wavelength of 1,550 nm as a center wavelength is incident to the beam splitter of this embodiment, even when the beam is an S-polarized beam or a P-polarized beam, reflectances which are almost equal to each other can be obtained. Note that the dependence of the beam splitter on a polarized beam having a wavelength of about 1,550±40 nm was 0.1 dB or less.

The materials constituting the layers are not limited to Table 1. Materials having refractive indexes falling within the ranges shown in Table 2 may be used as the materials of the layers. In addition, each layer may be constituted by a multilayer film having optical characteristics equivalent to those of the corresponding layer, as a matter of course. For example, as a layer having a refractive index of about 2.085, a layer having a three-layered structure such as a $Ta_2O_5/SiO_2/Ta_2O_5$ structure or a $Ta_2O_5/TiO_2/Ta_2O_5$ structure may be used.

TABLE 2

|  | Refractive Index Range |
| --- | --- |
| Fifth Layer 12e | 1.44–1.47 |
| Fourth Layer 12d | 2.25–2.38 |
| Third Layer 12c | 1.44–1.47 |
| Second Layer 12b | 2.25–2.38 |
| First Layer 12a | 2.02–2.20 |
| Substrate | 1.45–1.60 |

It was confirmed that, even when the first and the third layers are replaced with each other, or even when the first and fifth layers are replaced with each other, a beam splitter free from the dependence on a polarized beam having the center wavelength can be arranged. More specifically, the first layer may be constituted by a layer having a refractive index of about 1.45, and the third layer may be constituted by a layer having a refractive index of about 2.1. The first layer may be constituted by a layer having a refractive index of about 1.45, and the fifth layer may be constituted by a layer having a refractive index of about 2.1. In the beam splitter having the above arrangement, although a wavelength range having the dependence on a polarized beam smaller than that of the spectral reflectance characteristics shown in FIG. 2 becomes narrow, the dependence on a polarized beam at the design center wavelength becomes 0.1 dB or less.

Note that the layers respectively having the above refractive indexes can be obtained by controlling the partial pressure of oxygen and a substrate temperature without generating a plasma. However, when no bombardment with oxygen ions during vacuum deposition is used, a high-density layer having good reproductivity cannot be obtained. For this reason, when no ion bombardment is used, a beam splitter free from the dependence on a polarized beam cannot be easily obtained, and the manufactured beam splitter is adversely affected by humidity in the atmosphere. For this reason, the beam splitter cannot be stably used for a long period of time.

Figure 3:
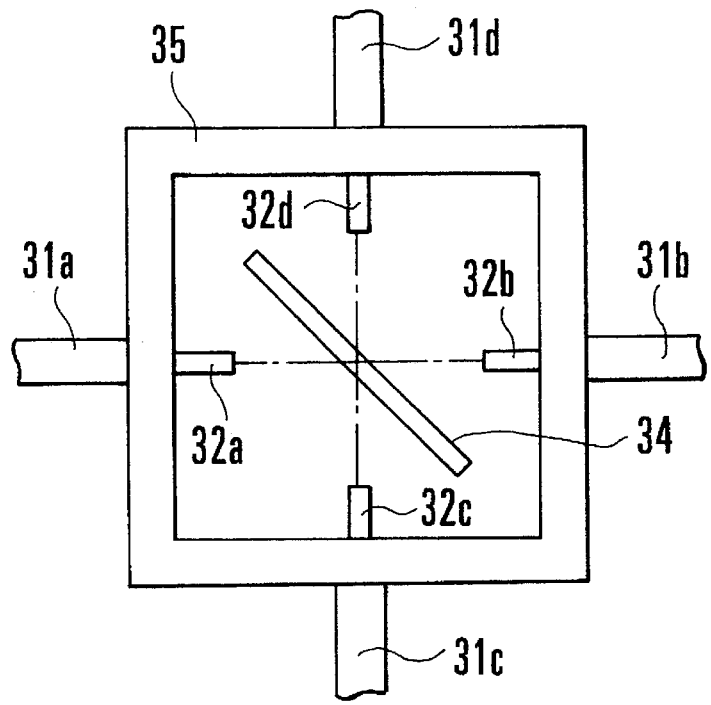
FIG. 3 is a sectional view showing the arrangement of an optical coupler according to the embodiment of the present invention.
Figure 4:
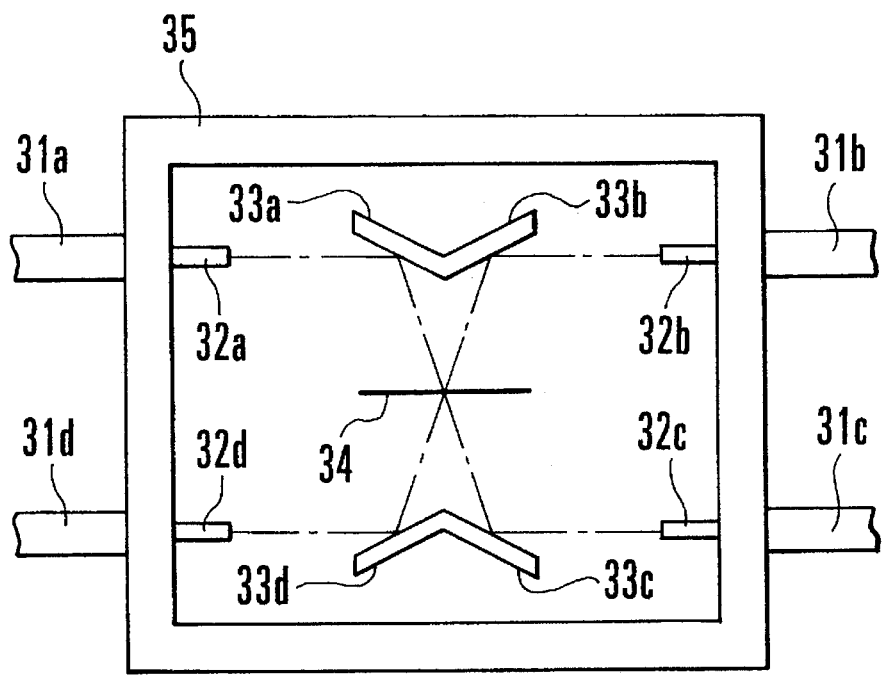
FIG. 4 is a sectional view showing a conventional optical coupler.

FIG. 3 shows an optical coupler manufactured using the beam splitter of this embodiment. Referring to FIG. 3, in a housing 35 having a square shape when viewed from a side direction, optical fibers 31a to 31d and lenses 32a to 32d respectively arranged on the end faces of the optical fibers 31a to 31d are respectively fixed to the central portions of the four sides of the housing 35 such that the sets of optical fibers and lenses are respectively perpendicular to the sides. That is, the set of optical fiber 31a and lens 32a, the set of optical fiber 31b and lens 32b, the set of optical fiber 31c and lens 32c, and the set of optical fiber 31d and lens 32d are attached to the housing 35 such that incident beams from the optical fibers 31a to 31d, i.e., the optical axes of the lenses 32a to 32d, form a cross. A beam splitter 34 having the structure shown in FIG. 1 is arranged at the central point of the crossed optical axes such that the beam splitter 34 is inclined at 45° with respect to the optical axes of the lenses 32a to 32d.

In the above arrangement, about 15% of each of the incident beams from the optical fibers 31a to 31d is reflected by the beam splitter 34 in a direction shifted by 90° from the incident direction of the corresponding incident beam independently of the polarization state of the incident beam, and about 85% of the incident beams is transmitted through the beam splitter 34 in the same direction as the incident direction. For example, about 15% of a beam incident from the optical fiber 31a onto the beam splitter 34 through the lens 32a is output to the optical fiber 31c as a reflected beam, and about 85% of the beam from the optical fiber 31a is output to the optical fiber 31b as a transmitted beam.

Since the optical coupler arranged as described above need not use a total reflection element, the optical coupler can be made smaller than a conventional optical coupler. In addition, since the optical fibers 31a to 31d are arranged at angles of 90° and 180°, the optical fibers 31a to 31d can be easily connected to other devices.

Note that the angle of incidence of a beam incident to the beam splitter 34 may practically fall within the range of 40° to 50°. In addition, although the optical branching ratio is set to be about 85:15 in the above embodiment, the optical branching ratio is not limited to the above embodiment, and other predetermined optical branching ratios can be obtained with more or less number of layers of materials used in the present invention.

In a beam splitter according to the present invention, even when, an angle of incidence of 45° at which the reflectance and transmittance of a conventional beam splitter are dependent on the polarized direction of an incident beam is used, the reflectance and transmittance are not dependent on a polarized beam. For this reason, when the beam splitter of the present invention is used, an optical coupler can be obtained, which transmits about 85% of an incident beam in the same direction as that of the incident beam and reflects about 15% of the incident beam in the direction perpendicular to the incident beam independently of the polarization state of the incident beam without using a total reflection element.

In one embodiment of the invention, the refractive indexes of the substrate and the first to fifth layers, respectively, are approximately equal to 1.5, 1.45, 2.3, 2.1, 2.3 and 1.45. The geometrical thickness $d_i$ of the ith layer of the first to fifth layers satisfies the relation $n_i d_i \cos(\theta_i) = \lambda/4$. where $n_i$ is the refractive index of the ith layer, $\theta_i$ is the angle of refraction in the ith layer, and $\lambda$ is the center wavelength of the incident light beam to the multilayer film with the angle of incidence of 40° to 50°.

In another embodiment of the invention, tantalum oxide ($Ta_2O_5$) having a refractive index of 2.085 is used as a material constituting the layer having a refractive index of 2.02 to 2.20, silicon dioxide ($SiO_2$) having a refractive index of 1.45 is used as a material constituting the layer having a refractive index of 1.44 to 1.47, and titanium dioxide ($TiO_2$) having a refractive index of 2.32 is used as a material constituting the layer having a refractive index of 2.25 to 2.38.

What is claimed is:

1. A beam splitter which is an optical multilayer film obtained by sequentially stacking first to fifth layers respectively having refractive indexes of $n_1$ to $n_5$ and geometrical thicknesses $d_1$ to $d_5$ on a substrate having a refractive index $n_G$, wherein the refractive indexes of said substrate and said first to fifth layers satisfy the following relationship: of $n_G$=1.45 to 1.60, $n_1$=2.02 to 2.20, $n_2$=2.25 to 2.38, $n_3$=1.44 to 1.47, $n_4$=2.25 to 2.38, and $n_5$=1.44 to 1.47, and a geometrical thickness $d_i$ of an ith layer of the first to fifth layers satisfies relationship $n_i d_i \cos(\theta_i) = \lambda/4$, where $n_i$ is a refractive index of the ith layer, $\theta_i$ is an angle of refraction in the ith layer, and $\lambda$ is a center wavelength of an incident light beam to the multilayer film with an angle of incidence of 40° to 50°.

2. A splitter according to claim 1, wherein:

the refractive indexes of said substrate and said first to fifth layers satisfy a relationship of $n_G$ is approximately 1.5, $n_1$ is approximately 2.1, $n_2$ is approximately 2.3, $n_3$ is approximately 1.45, $n_4$ is approximately 2.3, and $n_5$ is approximately 1.45, and the geometrical thickness $d_i$ of the ith layer of the first to fifth layers satisfies the relation $n_i d_i \cos(\theta_i) = \lambda/4$, where $n_i$ is the refractive index of the ith layer, $\theta_i$ is the angle of refraction in the ith layer, and $\lambda$ is the center wavelength of the incident light beam to the multilayer film with the angle of incidence of 40° to 50°.

3. A splitter according to claim 1, wherein the refractive indexes of said substrate and said first to fifth layers satisfy a relationship of $n_G$ is approximately 1.5, $n_1$ is approximately 1.45, $n_2$ is approximately 2.3, $n_3$ is approximately 1.45, $n_4$ is approximately 2.3, and $n_5$ is approximately 2.1, and the geometrical thickness $d_i$ of the ith layer of the first to fifth layers satisfies the relation $n_i d_i \cos(\theta_i) = \lambda/4$, where $n_i$ is the refractive index of the ith layer, $\theta_i$ is the angle of refraction in the ith layer, and $\lambda$ is the center wavelength of the incident light beam to the multilayer film with the angle of incidence of 40° to 50°.

4. A splitter according to claim 1, wherein the refractive indexes of said substrate and said first to fifth layers satisfy a relationship of $n_G$ is approximately 1.5, $n_1$ is approximately 1.45, $n_2$ is approximately 2.3, $n_3$ is approximately 2.1, $n_4$ is approximately 2.3, and $n_5$ is approximately 1.45, and the geometrical thickness $d_i$ of the ith layer of the first to fifth layers satisfies the relation $n_i d_i \cos(\theta_i) = \lambda/4$, where $n_i$ is the refractive index of the ith layer, $\theta_i$ is the angle of refraction in the ith layer, and $\lambda$ is the center wavelength of the incident light beam to the multilayer film with the angle of incidence of 40° to 50°.

5. A splitter according to claim 1, wherein tantalum oxide ($Ta_2O_5$) having a refractive index of 2.085 is used as a material constituting the layer having a refractive index of 2.02 to 2.20, silicone dioxide ($SiO_2$), having a refractive index of 1.45 is used as a material constituting a layer having a refractive index of 1.44 to 1.47, and titanium dioxide ($TiO_2$) having a refractive index of 2.32 is used as a material constituting the layer having a refractive index of 2.25 to 2.38.

6. A splitter according to claim 5, wherein a layer having a refractive index of 2.02 to 2.20 is constituted by an equivalent film constituted by a plurality of films.

7. A splitter according to claim 1, wherein said first to fifth layers are stacked to be sequentially formed on said substrate by means of vacuum deposition with bombardment of ions produced from oxygen plasma.

8. An optical coupler comprising:

a beam splitter which is an optical multilayer film obtained by sequentially stacking first to fifth layers respectively having refractive indexes of $n_1$ to $n_5$ and geometrical thicknesses $d_1$ to $d_5$ on a substrate having a refractive index $n_G$, and in which the refractive indexes of said substrate and said first to fifth layers satisfy a relationship of $n_G$=1.45 to 1.60, $n_1$=2.02 to 2.20, $n_2$=2.25 to 2.38, $n_3$=1.44 to 1.47, $n_4$=2.25 to 2.38, and $n_5$=1.44 to 1.47, and a geometrical thickness $d_i$ of an ith layer of the first to fifth layers satisfies relation $n_i d_i \cos(\theta_i) = \lambda/4$, where $n_i$ is a refractive index of the ith layer, $\theta_i$ is an angle of refraction in the ith layer, and $\lambda$ is a center wavelength of an incident light beam to the multilayer film with an angle of incidence of 40° to 50°;

a first optical fiber arranged such that a light beam is incident to said beam splitter at an angle of about 45°;

a second optical fiber, arranged to oppose said first optical fiber at an angle of 180°, on which a beam output from said first optical fiber and transmitted through said beam splitter is incident; and a third optical fiber, arranged to oppose said first optical fiber at 90°, on which a beam output from said first optical fiber and reflected from said beam splitter is incident.

9. A coupler according to claim 8, further comprising a fourth optical fiber, arranged perpendicular to said first optical fiber, another beam incident to said beam splitter at an angle about 45 degree, and said another beam being transmitted through said splitter and received by said third optical fiber.

10. A coupler according to claim 8, wherein about 85% of a beam from said first optical fiber is incident to said second optical fiber through said beam splitter, and about 15% of the beam from said first optical fiber is incident to said third optical fiber through said beam splitter.

11. An optical coupler comprising:

first to fourth optical fibers arranged such that optical axes of beams input to and output from said first to fourth optical fibers form a cross; and a beam splitter which is an optical multilayer film obtained by sequentially stacking first to fifth layers respectively having refractive indexes of $n_1$ to $n_5$ and geometrical thicknesses $d_1$ to $d_5$ on a substrate having a refractive index $n_G$, and in which the refractive indexes of said substrate and said first to fifth layers satisfy the following relationship $n_G=1.45$ to 1.60, $n_1=2.02$ to 2.20, $n_2=2.25$ to 2.38, $n_3=1.44$ to 1.47, $n_4=2.25$ to 2.38, and $n_5=1.44$ to 1.47, and a geometrical thickness $d_i$ of an ith layer of the first to fifth layers satisfies relation $n_i d_i \cos(\theta_i)=\lambda/4$, where $n_i$ is a refractive index of the ith layer, $\theta_i$ is an angle of refraction in the ith layer, and $\lambda$ is a center wavelength of an incident light beam to the multilayer film with an angle of incidence of 40° to 50°.

12. A beam splitter which is an optical multilayer film obtained by sequentially stacking first to fifth layers respectively having refractive indexes of $n_1$ to $n_5$ and geometrically thicknesses $d_1$ to $d_5$ on a substrate having a refractive index $n_G$, wherein the refractive index of said substrate and said first to fifth layers satisfy the following relationship: $n_G=1.45$ to 1.60, $n_1=1.44$ to 1.47, $n_2=2.25$ to 2.38, $n_3=1.44$ to 1.47, $n_4=2.25$ to 2.38, and $n_5=2.02$ to 2.20, and a geometrical thickness $d_i$ of an ith layer of the first to fifth layers satisfies the relationship $n_i d_i \cos(\theta_i)=\lambda/4$, where $n_i$ is a refractive index of the ith layer, $\theta_i$ is an angle of refraction in the ith layer and $\lambda$ is a center wavelength of an incident light beam to the multilayer film with an angle of incidence of 40° to 50°.

13. A splitter according to claim 12, wherein the refractive indexes of said substrate and said first to fifth layers satisfy a relationship of $n_G$ is approximately 1.5, $n_1$ is approximately 2.1, $n_2$ is approximately 2.3, $n_3$ is approximately 1.45, $n_4$ is approximately 2.3, and $n_5$ is approximately 1.45, and the geometrical thickness $d_i$ of the ith layer of the first to fifth layers satisfies the relation $n_i d_i \cos(\theta_i)=\lambda/4$, where $n_i$ is the refractive index of the ith layer, $\theta_i$ is the angle of refraction in the ith layer, and $\lambda$ is the center wavelength of the incident light beam to the multilayer film with the angle of incidence of 40° to 50°.

14. A splitter according to claim 12, wherein the refractive indexes of said substrate and said first to fifth layers satisfy a relationship of $n_G$ is approximately 1.5, $n_1$ is approximately 1.45, $n_2$ is approximately 2.3, $n_3$ is approximately 1.45, $n_4$ is approximately 2.3, and $n_5$ is approximately 2.1, and the geometrical thickness $d_i$ of the ith layer of the first to fifth layers satisfies the relation $n_i d_i \cos(\theta_i)=\lambda/4$, where $n_i$ is the refractive index of the ith layer, $\theta_i$ is the angle of refraction in the ith layer, and $\lambda$ is the center wavelength of the incident light beam to the multilayer film with the angle of incidence of 40° to 50°.

15. A splitter according to claim 12, wherein the refractive indexes of said substrate and said first to fifth layers satisfy a relationship of $n_G$ is approximately 1.5, $n_1$ is approximately 1.45, $n_2$ is approximately 2.3, $n_3$ is approximately 2.1, $n_4$ is approximately 2.3, and $n_5$ is approximately 1.45, and the geometrical thickness $d_i$ of the ith layer of the first to fifth layers satisfies the relation $n_i d_i \cos(\theta_i)=\lambda/4$, where $n_i$ is the refractive index of the ith layer, $\theta_i$ is the angle of refraction in the ith layer, and $\lambda$ is the center wavelength of the incident light beam to the multilayer film with the angle of incidence of 40° to 50°.

16. A splitter according to claim 12, wherein tantalum oxide ($Ta_2O_5$) having a refractive index of 2.085 is used as a material constituting the layer having a refractive index of 2.02 to 2.20, silicone dioxide ($SiO_2$), having a refractive index of 1.45 is used as a material constituting a layer having a refractive index of 1.44 to 1.47, and titanium dioxide ($TiO_2$) having a refractive index of 2.32 is used as a material constituting the layer having a refractive index of 2.25 to 2.38.

17. A splitter according to claim 16, wherein a layer having a refractive index of 2.02 to 2.20 is constituted by an equivalent film constituted by a plurality of films.

18. A splitter according to claim 12, wherein said first to fifth layers are stacked to be sequentially formed on said substrate by means of vacuum deposition with bombardment of ions produced from oxygen plasma.

19. A beam splitter which is an optical multilayer film obtained by sequentially stacking first to fifth layers respectively having refractive indexes of $n_1$ to $n_5$ and geometrically thicknesses $d_1$ to $d_5$ on a substrate having a refractive index $n_G$, wherein the refractive index of said substrate and said first to fifth layers satisfy the following relationship: $n_G=1.45$ to 1.60, $n_1=1.44$ to 1.47, $n_2=2.25$ to 2.38, $n_3=2.02$ to 2.20, $n_4=2.25$ to 2.38, and $n_5=1.44$ to 1.47, and a geometrical thickness $d_i$ of an ith layer of the first to fifth layers satisfies the relationship $n_i d_i \cos(\theta_i)=\lambda/4$, where $n_i$ is the refractive index of the ith layer, $\theta_i$ is an angle of refraction in the ith layer, and $\lambda$ is a center wavelength of an incident light beam to the multilayer film with an angle of incidence of 40° to 50°.

20. A splitter according to claim 19, wherein the refractive indexes of said substrate and said first to fifth layers satisfy a relationship of $n_G$ is approximately 1.5, $n_1$ is approximately 2.1, $n_2$ is approximately 2.3, $n_3$ is approximately 1.45, $n_4$ is approximately 2.3, and $n_5$ is approximately 1.45, and the geometrical thickness $d_i$ of the ith layer of the first to fifth layers satisfies the relation $n_i d_i \cos(\theta_i)=\lambda/4$, where $n_i$ is the refractive index of the ith layer, $\theta_i$ is the angle of refraction in the ith layer, and $\lambda$ is the center wavelength of the incident light beam to the multilayer film with the angle of incidence of 40° to 50°.

21. A splitter according to claim 20, wherein the refractive indexes of said substrate and said first to fifth layers satisfy a relationship of $n_G$ is approximately 1.5, $n_1$ is approximately 1.45, $n_2$ is approximately 2.3, $n_3$ is approximately 1.45, $n_4$ is approximately 2.3, and $n_5$ is approximately 2.1, and the geometrical thickness $d_i$ of the ith layer of the first to fifth layers satisfies the relation $n_i d_i \cos(\theta_i)=\lambda/4$, where $n_i$ is the refractive index of the ith layer, $\theta_i$ is the angle of refraction in the ith layer, and $\lambda$ is the center wavelength of the incident light beam to the multilayer film with the angle of incidence of 40° to 50°.

22. A splitter according to claim 20, wherein the refractive indexes of said substrate and said first to fifth layers satisfy a relationship of $n_G$ is approximately 1.5, $n_1$ is approximately 1.45, $n_2$ is approximately 2.3, $n_3$ is approximately 2.1, $n_4$ is approximately 2.3, and $n_5$ is approximately 1.45, and the geometrical thickness $d_i$ of the ith layer of the first to fifth layers satisfies the relation $n_i d_i \cos(\theta_i)=\lambda/4$, where $n_i$ is the refractive index of the ith layer, $\theta_i$ is the angle of refraction in the ith layer, and $\lambda$ is the center wavelength of the incident light beam to the multilayer film with the angle of incidence of 40° to 50°.

23. A splitter according to claim 20, wherein tantalum oxide ($Ta_2O_5$) having a refractive index of 2.085 is used as a material constituting the layer having a refractive index of 2.02 to 2.20, silicone dioxide ($SiO_2$), having a refractive index of 1.45 is used as a material constituting a layer having a refractive index of 1.44 to 1.47, and titanium dioxide ($TiO_2$) having a refractive index of 2.32 is used as a material constituting the layer having a refractive index of 2.25 to 2.38.

24. A splitter according to claim 23, wherein a layer having a refractive index of 2.02 to 2.20 is constituted by an equivalent film constituted by a plurality of films.

25. A splitter according to claim 20, wherein said first to fifth layers are stacked to be sequentially formed on said substrate by means of vacuum deposition with bombardment of ions produced from oxygen plasma.

26. An optical coupler comprising:

a beam splitter which is an optical multilayer film obtained by sequentially stacking first to fifth layers respectively having refractive indexes of $n_1$ to $n_5$ and geometrical thicknesses $d_1$ to $d_5$ on a substrate having a refractive index $n_G$, and in which the refractive index of said substrate and said first to fifth layers satisfy a relationship of $n_G$=1.45 to 1.60, $n_1$=1.44 to 1.47, $n_2$=2.25 to 2.38, $n_3$=1.44 to 1.47 a geometrical thickness $d_i$ of an ith layer of the first to fifth layers satisfies relation $n_i d_i \cos(\theta_i)=\lambda/4$, where $n_i$ is a refractive index of the ith layer, $\theta_i$ is an angle of refraction in the ith layer, and $\lambda$ is a center wavelength of an incident light beam to the multilayer film with an angle of incidence of 40° to 50°.

a first optical fiber arranged such that a light beam is incident to said beam splitter at an angle of about 45°;

a second optical fiber, arranged to oppose said first optical fiber at an angle of 180°, on which a beam output from said first optical fiber and transmitted through said beam splitter is incident; and a third optical fiber, arranged to oppose said first optical fiber at 90°, on which a beam output from said first optical fiber and reflected from said beam splitter is incident.

27. A coupler according to claim 26, further comprising a fourth optical fiber, arranged perpendicular to said first optical fiber, another beam incident to said beam splitter at an angle about 45 degree, and said another beam being transmitted through said splitter and received by said third optical fiber.

28. A coupler according to claim 26, wherein about 85% of a beam from said first optical fiber is incident to said second optical fiber through said beam splitter, and about 15% of the beam from said first optical fiber is incident to said third optical fiber through said beam splitter.

29. An optical coupler comprising:

a beam splitter which is an optical multilayer film obtained by sequentially stacking first to fifth layers respectively having refractive indexes of $n_1$ to $n_5$ and geometrical thicknesses $d_1$ to $d_5$ on a substrate having a refractive index $n_G$, and in which the refractive index of said substrate and said first to fifth layers satisfy a relationship of $n_G$=1.45 to 1.60, $n_1$=1.44 to 1.47, $n_2$=2.25 to 2.38, $n_3$=2.02 to 2.20, $n_4$=2.25 to 2.38, and $n_5$=1.44 to 1.47, and a geometrical thickness $d_i$ of an ith layer of the first to fifth layers satisfies relation $n_i d_i \cos(\theta_i)=\lambda/4$, where $n_i$ is a refractive index of the ith layer, $\theta_i$ is an angle of refraction in the ith layer, and $\lambda$ is a center wavelength of an incident light beam to the multilayer film with an angle of incidence of 40° to 50°;

a first optical fiber arranged such that a light beam is incident to said beam splitter at na angle of about 45°;

a second optical fiber, arranged to oppose said first optical fiber at an angle of 180°, on which a beam output from said first optical fiber and transmitted through said beam splitter is incident; and a third optical fiber, arranged to oppose said first optical fiber at 90°, on which a beam output from said first optical fiber and reflected from said beam splitter is incident.

30. A coupler according to claim 29, further comprising a fourth optical fiber, arranged to oppose said first optical fiber at 270°, on which another beam incident to said beam splitter is set to be about 45° and a transmitted beam through said splitter is incident to said third optical fiber.

31. A coupler according to claim 29, wherein about 85% of a beam from said first optical fiber is incident to said second optical fiber through said beam splitter, and about 15% of the beam from said first optical fiber is incident to said third optical fiber through said beam splitter.

32. An optical coupler comprising:

first to fourth optical fibers arranged such that optical axes of beams input to and output from said first to fourth optical fibers form a cross; and a beam splitter which is an optical multilayer film obtained by sequentially stacking first to fifth layers respectively having refractive indexes of $n_1$ to $n_5$ and geometrical thicknesses $d_1$ to $d_5$ on a substrate having a refractive index $n_G$, and in which the refractive indexes of said substrate and said first to fifth layers satisfy the following relationship $n_G$=1.45 to 1.60, $n_1$=1.44 to 1.47, $n_2$=2.25 to 2.38, $n_3$ is 1.44 to 1.47, $n_4$=2.25 to 2.38, and $n_5$=2.02 to 2.20, and a geometrical thickness $d_i$ of an ith layer of the first to fifth layers satisfies relation $n_i d_i \cos(\theta_i)=\lambda/4$, where $n_i$ is a refractive index of the ith layer, $\theta_i$ is an angle of refraction in the ith layer, and $\lambda$ is a center wavelength of an incident light beam to the multilayer film with an angle of incidence of 40° to 50°.

33. An optical coupler comprising:

first to fourth optical fibers arranged such that optical axes of beams input to and output from said first to fourth optical fibers form a cross; and a beam splitter which is an optical multilayer film obtained by sequentially stacking first to fifth layers respectively having refractive indexes of $n_1$ to $n_5$ and geometrical thicknesses $d_1$ to $d_5$ on a substrate having a refractive index $n_G$, and in which the refractive indexes of said substrate and said first to fifth layers satisfy the following relationship $n_G$=1.45 to 1.60, $n_1$=1.44 to 1.47, $n_2$=2.25 to 2.38, $n_3$ is 2.02 to 2.20, $n_4$=2.25 to 2.38, and $n_5$=1.44 to 1.47, and a geometrical thickness $d_i$ of an ith layer of the first to fifth layers satisfies relation $n_i d_i \cos(\theta_i)=\lambda/4$, where $n_i$ is a refractive index of the ith layer, $\theta_i$ is an angle of refraction in the ith layer, and $\lambda$ is a center wavelength of an incident light beam to the multilayer film with an angle of incidence of 40° to 50°.

* * * * *